US007930678B2

(12) United States Patent
Tian et al.

(10) Patent No.: US 7,930,678 B2
(45) Date of Patent: Apr. 19, 2011

(54) VISUALIZING AND MODELING INTERACTION RELATIONSHIPS AMONG ENTITIES

(75) Inventors: Zhong Tian, Beijing (CN); Jian Wang, Beijing (CN); Jun Zhu, Beijing (CN); Wei Ding, Bei Jing (CN); Hai Qi Liang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/170,596

(22) Filed: Jun. 29, 2005

(65) Prior Publication Data
US 2006/0004872 A1    Jan. 5, 2006

(30) Foreign Application Priority Data

Jun. 30, 2004   (CN) .......................... 2004 1 0062568

(51) Int. Cl.
   *G06F 9/44*   (2006.01)
(52) U.S. Cl. ........................................ 717/105; 717/113
(58) Field of Classification Search .................. 717/100, 717/120, 140, 108; 716/4; 700/86
   See application file for complete search history.

(56) References Cited

U.S. PATENT DOCUMENTS

| | | | |
|---|---|---|---|
| 5,724,575 A | 3/1998 | Hoover et al. | |
| 6,225,998 B1 | 5/2001 | Okita et al. | |
| 6,662,357 B1 * | 12/2003 | Bowman-Amuah | 717/120 |
| 6,718,533 B1 * | 4/2004 | Schneider et al. | 717/100 |
| 6,789,054 B1 * | 9/2004 | Makhlouf | 703/6 |
| 6,789,251 B1 * | 9/2004 | Johnson | 717/100 |
| 6,804,686 B1 * | 10/2004 | Stone et al. | 1/1 |
| 6,865,429 B1 * | 3/2005 | Schneider et al. | 700/86 |
| 6,993,759 B2 * | 1/2006 | Aptus et al. | 717/170 |
| 6,996,800 B2 * | 2/2006 | Lucassen et al. | 717/106 |
| 7,240,324 B2 * | 7/2007 | Casati et al. | 717/103 |
| 7,246,345 B1 * | 7/2007 | Sharma et al. | 717/120 |
| 7,463,263 B2 * | 12/2008 | Gilboa | 345/440 |
| 2002/0029231 A1 * | 3/2002 | Aptus et al. | 707/513 |
| 2002/0046394 A1 * | 4/2002 | Do et al. | 717/108 |
| 2002/0165903 A1 * | 11/2002 | Zargham et al. | 709/202 |
| 2003/0069787 A1 * | 4/2003 | Tendon et al. | 705/14 |
| 2005/0005261 A1 * | 1/2005 | Severin | 717/108 |
| 2005/0010899 A1 * | 1/2005 | Kung et al. | 717/108 |

(Continued)

FOREIGN PATENT DOCUMENTS

EP         1221109         7/2002

OTHER PUBLICATIONS

R.W.S. Rodrigues, Formalising UML Activity Diagrams using Finite State Processes. In: Dynamic Behaviour in UML Models: Semantic Questions, York. UML 2000 (2000).*

(Continued)

*Primary Examiner* — Jason Mitchell
(74) *Attorney, Agent, or Firm* — Michael J. Buchenhorner; Vazken Alexanian (57) ABSTRACT

The present invention provides methods of visualizing and modeling the interaction relationship among entities. An example method of visualizing the interaction relationship among entities includes the steps of: presenting the internal logic of entity in an entity container; and presenting the interaction relationship among the entities in an interaction space. A method of modeling the interaction relationship among entities, includes the steps of: defining each entity related to said interaction relationship; defining an interface of said each entity in an interaction space; and defining interaction logics among said interfaces in the interaction space.

25 Claims, 11 Drawing Sheets

U.S. PATENT DOCUMENTS

| | | |
|---|---|---|
| 2005/0138641 A1* | 6/2005 | Kobylinski et al. ............ 719/318 |
| 2005/0256892 A1* | 11/2005 | Harken .......................... 707/101 |
| 2005/0289524 A1* | 12/2005 | McGinnes ..................... 717/140 |
| 2006/0059027 A1* | 3/2006 | Berenbach et al. ................ 705/7 |
| 2007/0028213 A1* | 2/2007 | D'Alo et al. ................... 717/120 |
| 2007/0157138 A1* | 7/2007 | Ciolfi et al. ........................ 716/4 |
| 2007/0294661 A1* | 12/2007 | Devarakonda et al. ....... 717/104 |

OTHER PUBLICATIONS

"OMG Unified Modeling Languge Specification", version 1.4, 2001.*

* cited by examiner

Prior Art

Fig.10

VISUALIZING AND MODELING INTERACTION RELATIONSHIPS AMONG ENTITIES

TECHNICAL FIELD OF THE INVENTION

The present invention relates to computer data processing technology, specifically, to the technology of visualizing and modeling interaction relationship among entities.

BACKGROUND OF THE INVENTION

From business area to computer area, entity interaction is widely existing in the real world, such as, the commercial actions among businesses, governments, customers, the communication among computers and/or servers, or the invocations among software components, etc. Here, the entities can be business entities, IT system or components, etc. For different purposes, people need to model entities and their interaction relationship. Especially, it often occurs in the following fields: business process integration, enterprise application integration, software development, computer protocol design, etc.

Figure 1:
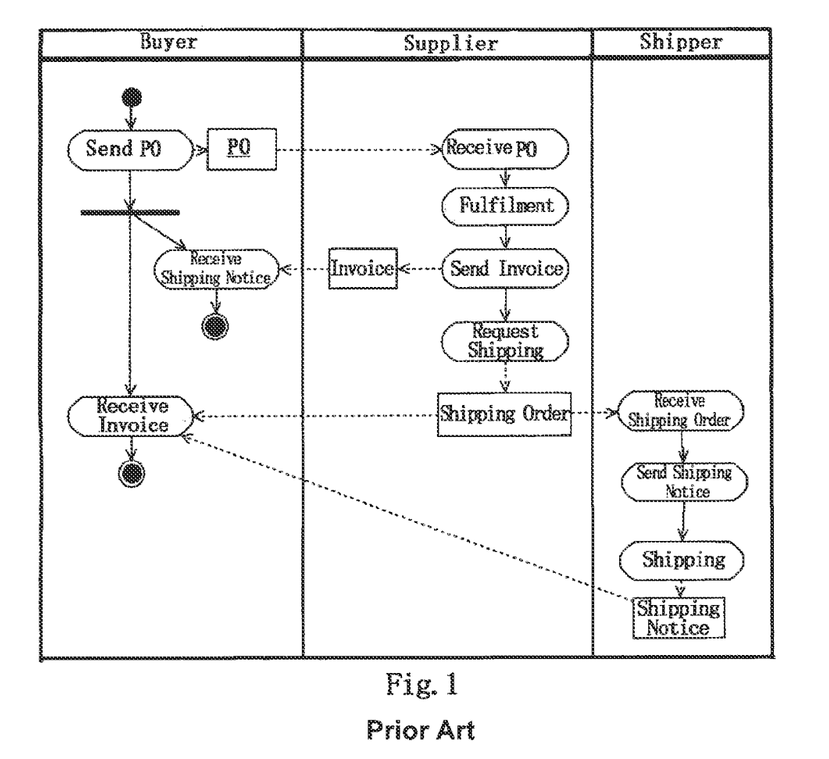
FIG. 1 shows an example of the UML activity diagram in the prior art.

For the above purposes, there has been proposed a number of solutions, including some visualizing and modeling methods and tools. They can be basically classified into the following categories:

.UML Activity Diagram and its variants, as shown in FIG. 1, Activity Diagram allows using swim lanes to model multiple entities and using data flows across lane boundary and objects to model the interaction among entities. It's a method of modeling entity behavior. It has the following drawbacks: it cannot model the data mapping and fusion relation; its swim lanes only allow containing flowchart, but not other ways of modeling the internal logics of entities, such as state diagram; it cannot model entity interface and entity interaction; it cannot reduce unnecessary lanes and only show major entities on demand.

Figure 2:
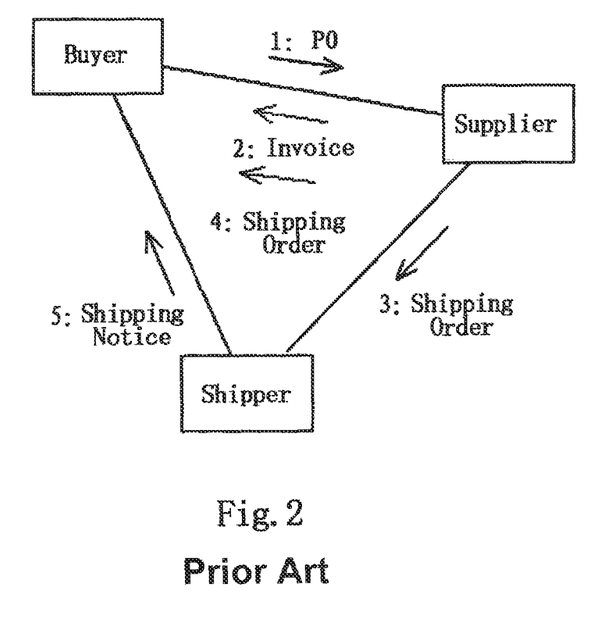
FIG. 2 shows an example of the UML collaboration diagram in the prior art.

.UML Collaboration Diagram and its variants, as shown in FIG. 2, Collaboration Diagram can model the interaction of multiple entities as a network. Each entity is a node of the network. The links among entities represent the interaction, and the interaction order can also be marked on links. Collaboration Diagram considers the entity as a black box, screens its internal logic and only shows the major message transfers among entities. This brings its major drawbacks: the audience cannot intuitively know how the sending message affects the entity's internal logic, why and how the entity sends out such a response message; it cannot model the data mapping and fusion relation.

Figure 3:
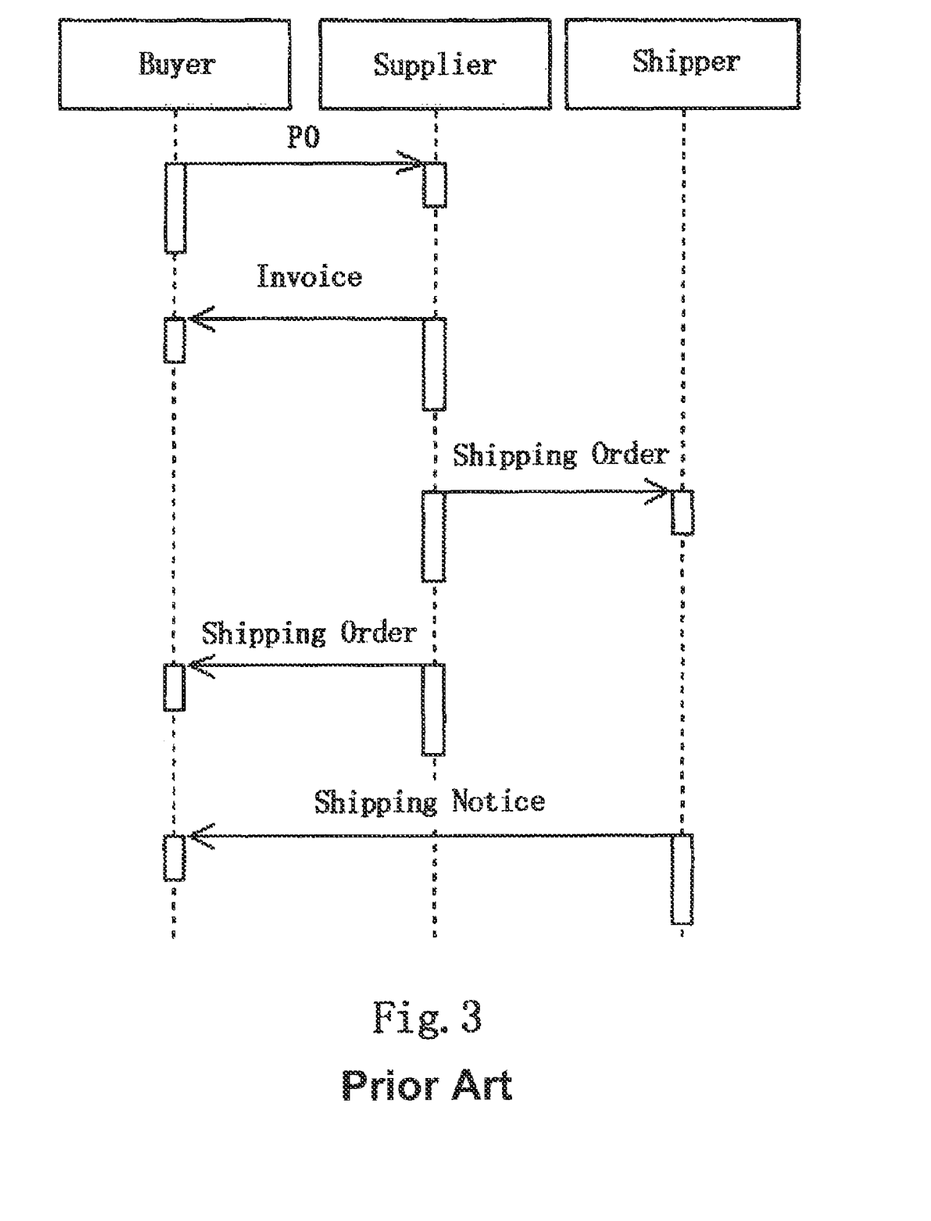
FIG. 3 shows an example of the UML sequence diagram in the prior art.

.UML Sequence Diagram and its variants, as shown in FIG. 3, Sequence Diagram models each entity as an interface and clearly presents the interaction sequence. It also considers entity as a black box. Its major drawbacks are basically similar with Collaboration Diagram.

Therefore, it is desired to visualize the complex interaction relationship among entities in an intuitive graphic way and model homogeneous or heterogeneous presentation manner and interaction logic for the internal logics of entities in a unified way.

SUMMARY OF THE INVENTION

To solve the above problems in the prior art, according to one aspect of the present invention, there is provided a method of visualizing the interaction relationship among entities, comprising: presenting the internal logic of entity in an entity container; and presenting the interaction relationship among the entities in an interaction space.

According to another aspect of the present invention, there is provided a method of modeling the interaction relationship among entities, comprising: defining each entity related to said interaction relationship; defining an interface of said each entity in an interaction space; and defining interaction logics among said interfaces in the interaction space.

BRIEF DESCRIPTION OF THE DRAWINGS

It is believed that features, advantages and objects of the present invention could be better understood from the following descriptions of the detailed implementation of the present invention in connection with the accompanying drawings, in which.

DETAILED DESCRIPTION OF THE INVENTION

The present invention provides methods of visualizing the interaction relationship among entities. An example embodiment includes the steps of presenting the internal logic of entity in an entity container; and presenting the interaction relationship among the entities in an interaction space.

In the present invention, there is also provided a method of modeling the interaction relationship among entities, comprising: defining each entity related to said interaction relationship; defining an interface of said each entity in an interaction space; and defining interaction logics among said interfaces in the interaction space. Particularly advantageous embodiments of the present invention will be described in detail in the following in connection with accompanying drawings.

Method of Visualizing Interaction Relationship Among Entities

Figure 4:
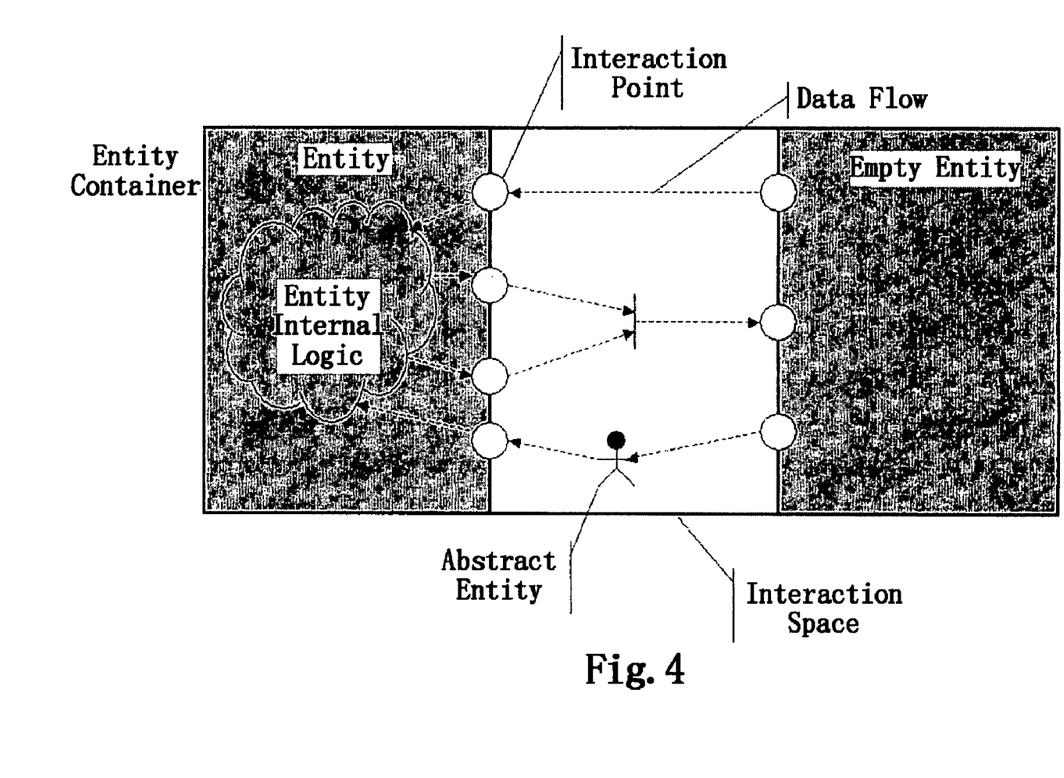
FIG. 4 is a diagram illustrating the method of visualizing the interaction relationship among entities according to one embodiment of the present invention.

The present invention provides a method of visualizing interaction relationship among entities to present the interaction relationship among entities in an intuitive graphic way. FIG. 4 is a diagram illustrating the method of visualizing the interaction relationship among entities according to one embodiment of the present invention.

According to that embodiment, as shown in FIG. 4, two kinds of separate containers are used to present the interaction relationship among entities, which are entity container and interaction space. Wherein entity container can be used to contain or display the internal logics of different kinds of entities. When an entity container contains an activity diagram, it is called as "activity lane". When containing a state chart, it is called as "state lane". The interaction space can be used to contain and display the data-flow-based interaction relationship among entity interfaces (which is also called as "data lane").

Thus, the internal logics of various entities and the interaction relationship among the entities can be visualized in a single view; each container (entity container or interaction space) can be modeled individually and displayed separately or composedly.

Next, the method of visualizing interaction relationship among entities of the present embodiment will be described in detail in connection with FIG. 4 to FIG. 6.

First, an entity can be presented in three modes, thereby showing or hiding the details of entity internal logic on user's demand. The three modes are:

"Icon mode", the most abstract and simplified one, which only shows the entity as a symbol (see the human-like icon in the interaction space in FIG. 4).

"Empty mode", the mode shows entity as an interface, ignores its internal logic (see the most right entity container in FIG. 4). Entity interface includes a set of interaction points through which the entity interacts with external.

"Detail mode", in this mode, both entity interface and entity internal logic are displayed. The present invention has no limitation in the type of internal logic model contained in an entity container. In the prior art, generally there are two types of entity internal logic models, one is called dynamic model, and the other is called static model. For example, (1) if the user wants to model the collaborative business process, the internal logic of the entity may be a flow chart, e.g., UML activity diagram shown in FIG. 5; (2) if the entity is one side of computer protocol, the internal logic may be modeled as a state chart, e.g., UML state chart or finite state machine, e.g., UML state chart in the left entity container in FIG. 9; (3) if the entity is a repository for keeping and providing data in a software system, its internal logic may be modeled as entity-relation diagram or UML class diagram. In (1) and (2), the internal logics belong to dynamic model, (3) belongs to static model. For a dynamic model, data flows can be used to link interaction points and activities in dynamic model. They stand for these activities will receive/send messages from/to external entities via interaction points on its interface (e.g., the dashed arrows in the left entity container in FIG. 5). For an entity with static model (e.g., a database), the internal data flow needn't be modeled.

Next, the details of presenting the interaction relationship among entities in an interaction space will be described. Interactions among entities can be classified as synchronized resource exchange and asynchronous resource exchange. In this embodiment, all resources (information, material, money, etc) are model as data. Interaction space is designed to present the data-exchanged-based interaction relation among associated entities. Interaction space uses the interface of the associated entities as its boundary. An interaction space may contain the following elements:

Interaction point, each interaction point belongs to an entity. The present embodiment uses a set of interaction points to define and present the interface an entity uses for interaction. Each interaction point may contain the following attributes: data set definition and interaction behavior definition. Data set definition is a specification for the exchanged resources (data); it specifies the content of resources. Data set may include primary data type (e.g., string, number, Boolean . . . ) and complex data type. Interaction behavior definition describes how the data is exchanged or handled, including data exchange modes (send, receive, retrieve, receive-send) and technical implementing information (e.g., messaging or API call, protocols, time). For example, in FIG. 5, the interaction point "Creation Req." and "Maintenance Req." are interaction points the project owner (entity 2) uses to interact with IPCheckList maintenance module (entity 1), the interaction point "Creation CMD", "Creation Evt." and "Update Evt.", "Archive Evt." are interaction points the IPCheckList maintenance module (entity 1) uses to interact with state control module (entity 3). The above interaction points form the interaction interface of the IPCheckList maintenance module.

Data flow, which connects interaction points and is represented by directional lines, its arrow stands for the direction of data movement. Data flow can be considered as a channel where data flows from one end to the other end. The data definitions on the two ends can be very different. So data flow can contain attributes that stand for data mapping rules and/or transformation rules to define mapping and transformation rules against detail data items. FIG. 6B illustrates the window used to set data mapping and transformation rules for data flow. In FIG. 6B, source IA tree diagram presents the information object at the upstream of data flow, destination IA tree diagram presents the information object at the downstream of data flow, while the list below describes the corresponding and transforming relation between source data format and destination data format of the data flow.

Further, in the present embodiment, in addition to presenting data flows of directly interaction that directly from one entity to another entity, the invention also supports join and split types of data flow with either "AND" or "OR" semantics. As shown in FIG. 6B, in upper side of the interaction space, the data flows coming from interaction points "PO cancel" and "PO confirm" join as one data flow and then reach the interaction point "PO respond". This is an OR join, that is, it can choose anyone of the multiple incoming data flows as the outgoing data flow. In other words, the "PO cancel" or "PO confirm" coming from the entity "Print & Dye service Corp." can reach the entity "Import/Export Corp." as a "PO respond". In the present embodiment, an OR join is presented by an OR join bar. Similarly, an AND join can merge the multiple incoming data flows into one outgoing data flow, it is presented by an AND join bar; an AND split represents splitting one incoming data flow into each of the multiple outgoing data flows, it is presented by an AND split bar; and an OR split represents splitting one incoming data flow into anyone of the multiple outgoing data flows, it is presented by an OR split bar.

Further, the above types of data flow can be combined to form more complex interaction logic. At the bottom of the interaction space in FIG. 6B, the data flow from the interaction point "Invoice" first flows through an AND split and is split into two data flows, one points to the abstraction entity "shipper", and the other AND joins with the data flow coming from the interaction point "shipper information" to form one data flow and reach the interaction point "Invoice".

Figure 5:
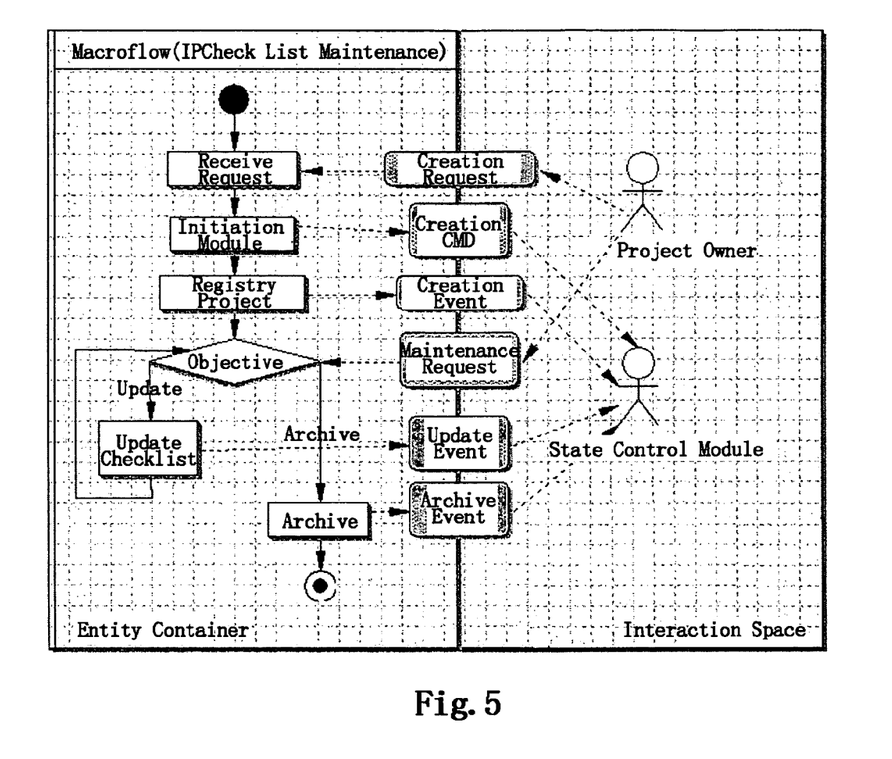
FIG. 5 is a diagram illustrating the method of visualizing the interaction relationship among entities according to one embodiment of the present invention.
Figure 6A:
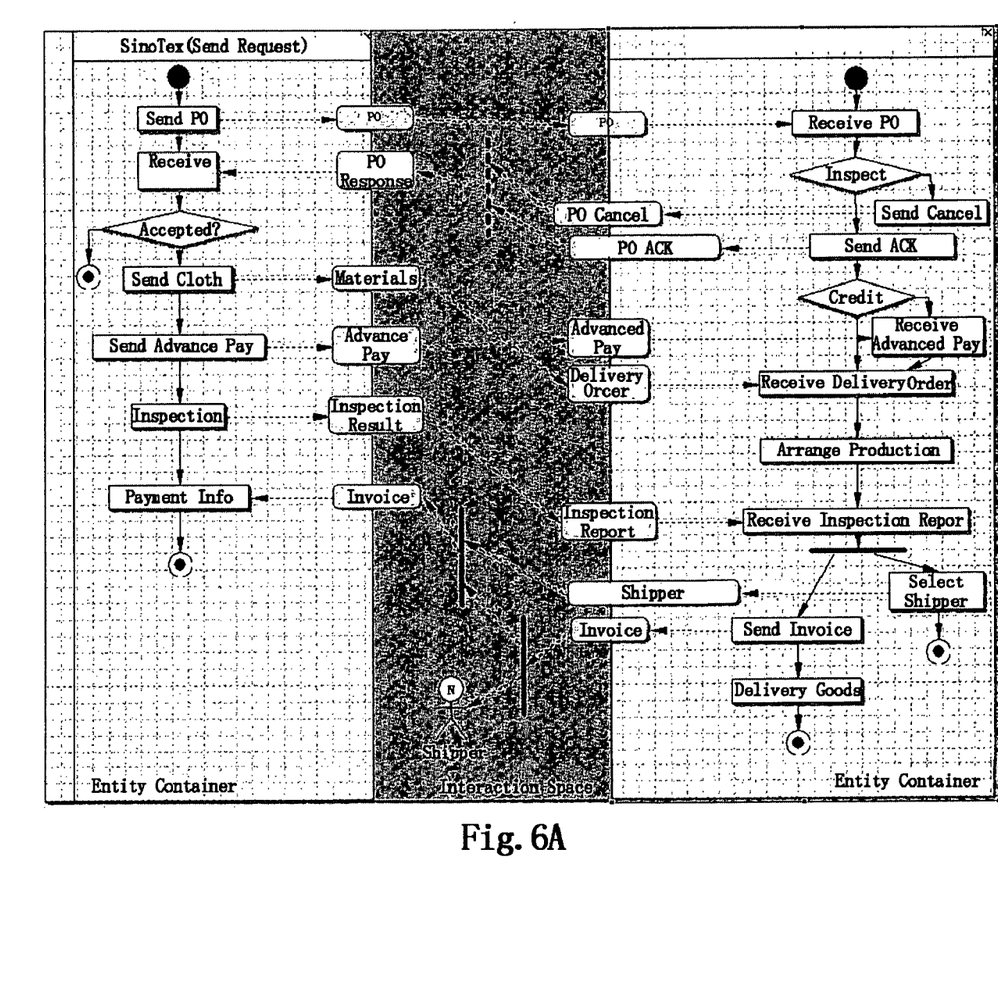
FIGS. 6A and 6B are diagrams illustrating the method of visualizing the interaction relationship among entities according to one embodiment of the present invention.
Figure 6B:
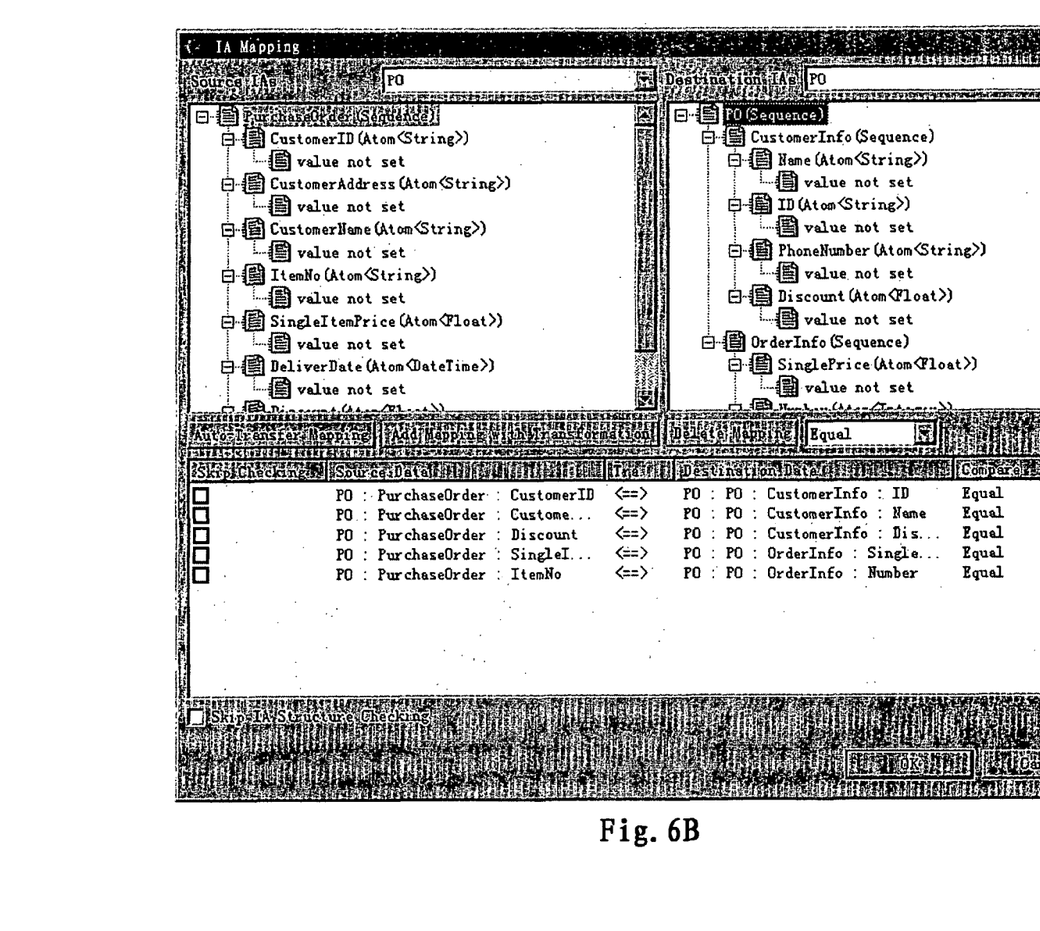

Abstraction entity, abstraction entity can also be contained in interaction space, that is, the entity in icon mode, as shown by the "Project owner" and the "State control module" in FIG. 5 and the "shipper" in FIG. 6A.

From the above description it can be seen that the internal logics and interaction relationship among homogeneous or heterogeneous entities can both be shown in a single view through the method of visualizing the interaction relationship among entities of the present embodiment, therefore it is more intuitive and the user can easily understand how the internal logic in each entity affects or is affected by other entities.

Interaction space and entity container can be used separately or composedly; the interaction space provides a new approach to specify interaction an interface and can define more detailed features of a data flow.

The internal logic models of entities can be shown in multiple modes, the user can show/hide the details of an entity among multiple abstraction levels on demand.

Method of Modeling Interaction Relationship Among Entities

Under the same inventive conception, the present invention also provides a method of modeling interaction relationship among entities in the above described visualization environment. The method of modeling interaction relationship among entities of the present embodiment will be described in the following in connection with FIG. 7 to FIG. 10, wherein the same technical terms and technical features as in the above embodiment will be omitted appropriately.

Figure 9:
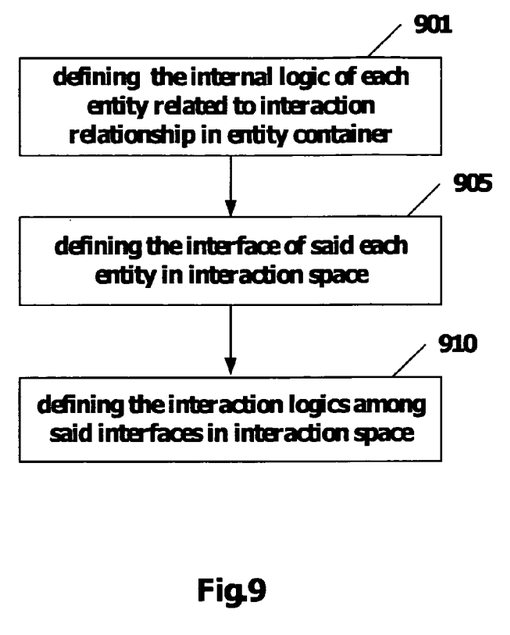
FIG. 9 is a flowchart of the method of modeling the interaction relationship among entities according to one embodiment of the present invention.

FIG. 9 is a flowchart of the method of modeling the interaction relationship among entities according to one embodiment of the present invention. As shown in FIG. 9, first at Step 901, the method of the embodiment defines in entity container the internal logic of each entity related to the interaction relationship. As described above, the present invention has no limitation on the internal logic model contained in the entity container, in this step, the internal logic of entity can be defined with dynamic model or static model, such as flow chart, state chart, etc.

Next, at Step 905, the interface of said each entity is defined in the interaction space. Specifically, the interface of each entity comprises a set of interaction points, in which each interaction point may include attributes that represent interaction data definition and/or interaction behavior definition.

Next, at Step 910, the interaction logics among said interfaces are defined in the interaction space. Specifically, said each interaction logic is defined with a data flow, wherein each data flow may include attributes that represent data mapping rules and/or transformation rules between the two ends of the data flow.

Further, the types of data flow include: direct interaction data flow; join data flow representing that multiple data flows join into one data flow; and split data flow representing that one data flow splits into multiple data flows. The join data flow further includes AND join data flow and OR join data flow; the split data flow further includes AND split data flow and OR split data flow. And these types of data flows can be combined to form more complex interaction logics.

Figure 10:
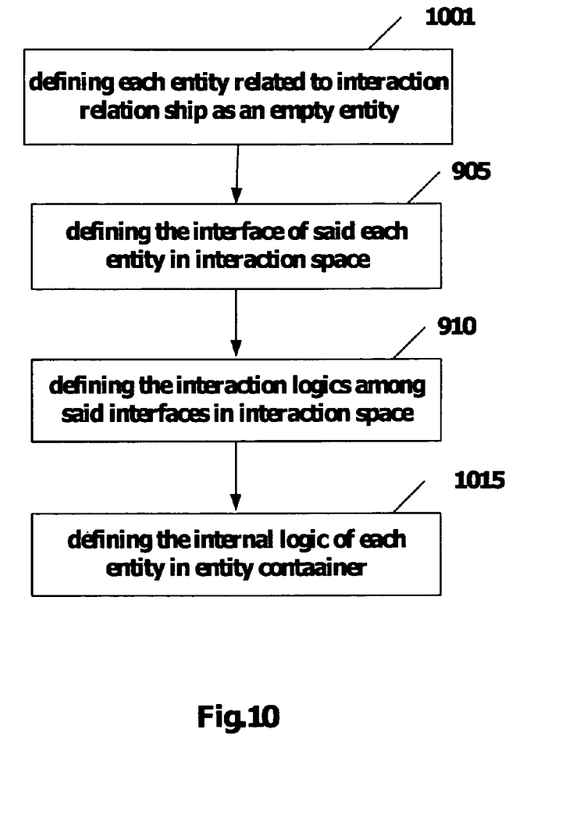
FIG. 10 is a flowchart of the method of modeling the interaction relationship among entities according to another embodiment of the present invention.

FIG. 10 is a flowchart of the method of modeling the interaction relationship among entities according to another embodiment of the present invention. In which the same components as in the above embodiments will be marked with the same number and their description will be omitted appropriately.

As shown in FIG. 10, the difference between the present embodiment and the previous embodiment lies in that, first, at Step 1001, each entity related to the interaction relationship is defined as an empty entity, that is, no detailed internal logic is defined for the entity. After Steps 905 and 910, that is, after defining the interfaces and interaction logics, Step 1015 is performed to define the internal logic of each entity in the entity container.

Figure 7:
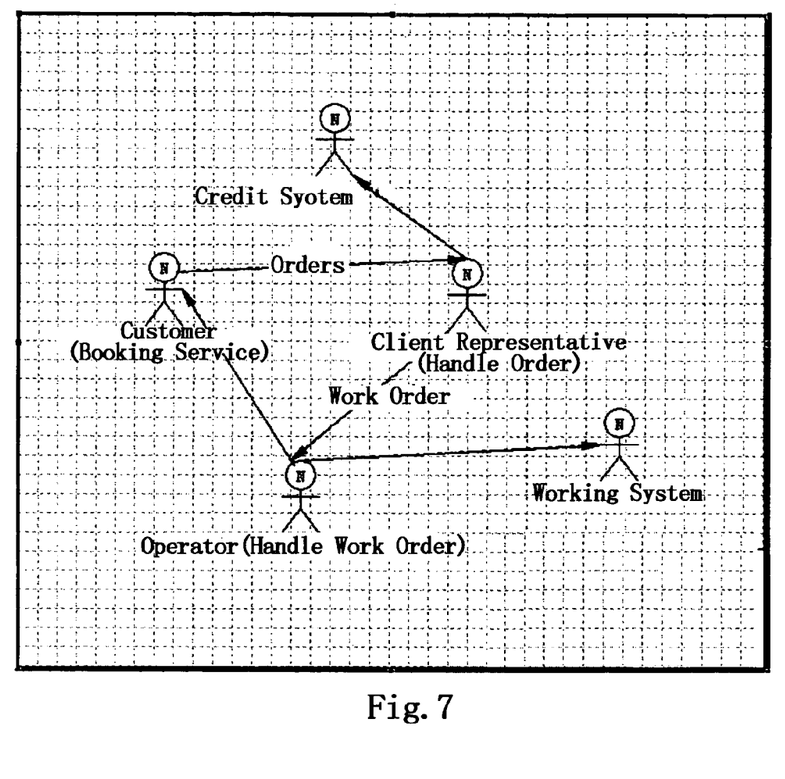
FIG. 7 is a diagram illustrating the method of modeling the interaction relationship among entities according to another embodiment of the present invention.
Figure 8:
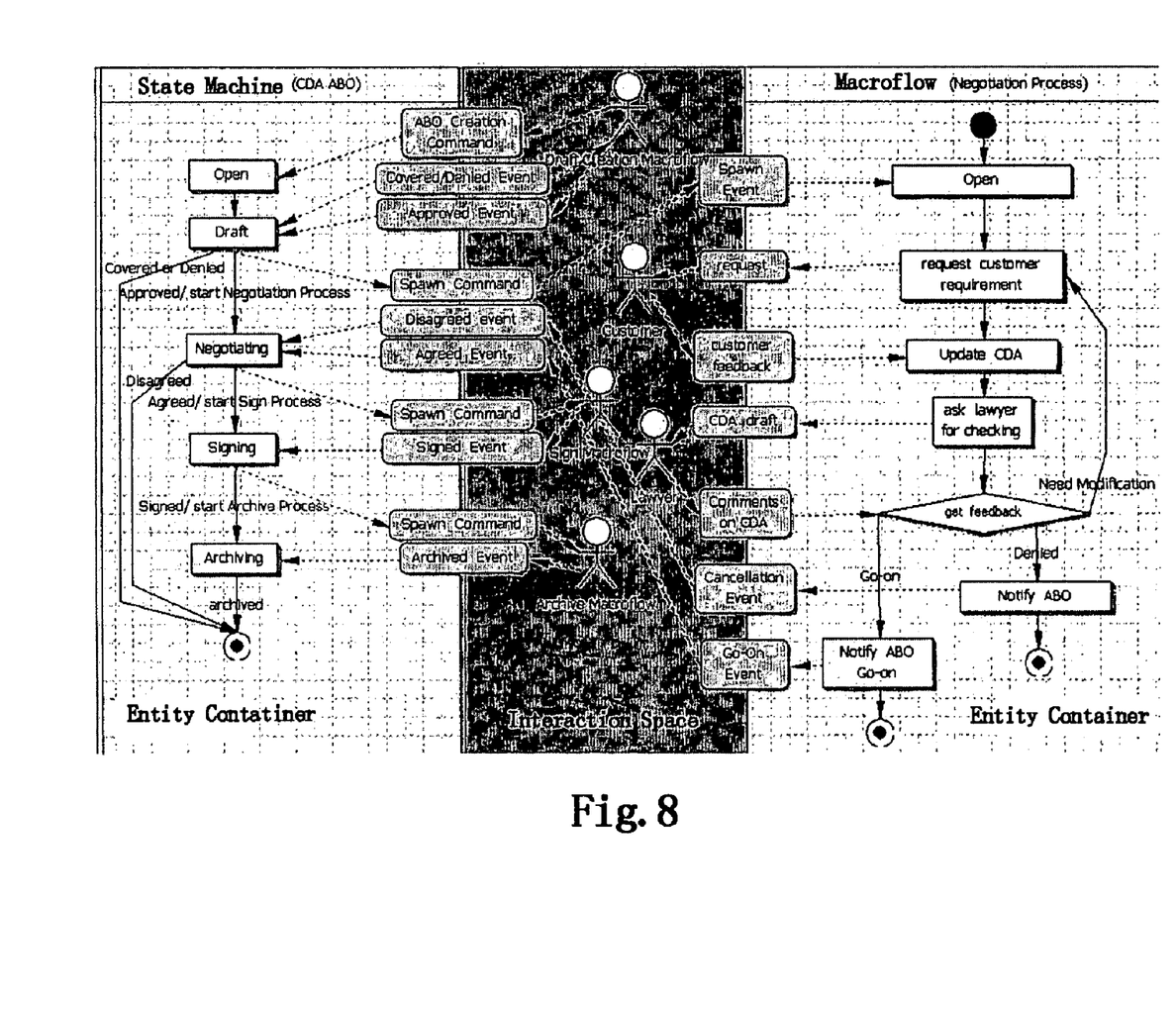
FIG. 8 is a diagram illustrating the method of modeling the interaction relationship among entities according to another embodiment of the present invention.

The user can model entities in three modes by utilizing the above-described method of visualizing the interaction relationship among entities and the method of modeling the interaction relationship among entities. The internal logic can be hidden and only the interface is displayed by switching detail mode to empty mode. Both detail mode and empty mode can also be collapsed to the icon mode. When there are many entities in the detail mode, the whole picture will become large and complex (as shown in FIG. 8). At that time, the user can collapse those secondary entities and only leave the major entities in detail mode there. When two interactive entities are modeled in icon mode, the interaction space between them can shrink as a directed solid line. The solid line is called abstract data flow that stands for existing particular association between the two entities (as shown in FIG. 7).

So the entities can be shown in different abstraction level on demand and then can be modeled by some different approaches. For example, in order to present the high-level entity collaboration relation, the user can only model the abstract entities (icon mode) and their association relation (as shown in FIG. 7). From that view, the user can extend anyone of the abstract entities and model its interface by adding necessary interaction points and data flows linked with other entities. Once finishing the interface definition, the user can continue to model its internal logic.

Still for example, the user can model detailed entities first, and then model the interaction. So the user can directly create some necessary empty entities and fill them in with possible internal logic, then connect interaction points with data flow or some possible abstract entities. The approach is often used to model business process. As shown in FIG. 8, the left entity is a state-driven software component with a state chart as internal logic. The right entity is a flow-driven component with a flow chart as internal logic. They communicate with each other and also interact with other secondary components.

Still for example, the user needn't model any entities' internal logics, only need model the interface, and then model the interaction logic. This approach is often used to model the computer protocols. Finally, the interaction space is just the visualization of the protocol.

From the above description it can be seen that the interaction relationship among homogeneous or heterogeneous entities can be modeled in a unified way by utilizing the method of modeling the interaction relationship among entities of the above embodiment, whatever among business entities, IT systems and components. Interaction space and entity container can be modeled, used, reused separately and individually; the user can work with more flexibility and efficiency.

Although the method of visualizing the interaction relationship among entities and the method of modeling the interaction relationship among entities of the present invention have been described in detail through some exemplary embodiments, the above embodiments are not exhaustive, those skilled in the art can implement various changes and modifications within the spirit and scope of the invention. Accordingly, the invention is not limited to these precise embodiments, the scope of the invention is only defined by accompany claims.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed, is:

1. A method for visualizing on a display an interaction relationship among entities, said method comprising:
using a computer apparatus for:
defining each of the entities related to the interaction relationship as an empty entity in an entity container with no detailed internal logic defined for said entity, until said detailed internal logic is provided by a user;
defining an interface of each of the entities in an interaction space container used to contain and display a data flow-based interaction relationship among entity interfaces, wherein said interface comprises a set of interaction points comprising attributes that represent an interaction data definition;
defining interaction logic among the interfaces in the interaction space container using data flows to connect interaction points; wherein said each interaction point comprises:
attributes that represent interaction data definition and/or interaction behavior definition; and
each said data flow comprises: attributes that represent data mapping rules and/or transformation rules between the two ends of said data flow;
modeling the entities and their interaction logic as a model in multiple abstraction levels selected by a user for showing/hiding details of an entity among the multiple abstraction levels for enabling the user to understand how an internal logic for each entity affects or is affected by other entities, wherein the model comprises the entity container and the interaction space container; and
using a graphical user interface with the display for: presenting the model in the abstraction level selected by the user in a single view on the display device wherein the two containers can be modeled individually by the user.

2. The method of claim 1 further comprising defining the internal logic of at least one empty entity in the entity container with the detailed internal logic as provided by the user.

3. The method of claim 2 wherein the detailed internal logic is provided by the user via the graphical user interface.

4. The method of claim 3 further comprising:
receiving a definition of at least one additional empty entity from the user;
receiving the detailed internal logic for the at least one additional empty entity; and
connecting related interaction points related to the at least one additional empty entity.

5. The method of claim 1, wherein presenting the model in the abstraction level selected by the user comprises displaying the entities in detail mode, comprising:
displaying the internal logic in the entity container; and
displaying the entity interface in the interaction space container.

6. The method of claim 5 wherein displaying the internal logic comprises displaying at least one of: a flowchart, a state chart, and a UML class diagram.

7. The method of claim 1, wherein presenting the model in the abstraction level selected by the user comprises displaying the entities in empty mode, comprising:
displaying the entity as an interface with a set of interaction points; and
not displaying the internal logic.

8. The method of claim 1, wherein presenting the model in the abstraction level selected by the user comprises displaying the entities in icon mode, comprising:
displaying the entity as a symbol in the entity container;
collapsing secondary entities within the entity container; and
displaying the interaction space between two interactive entities as a directed solid line in the interaction space container.

9. The method of claim 1, further comprising:
representing the interaction logic with a join symbol when a plurality of data flows join into one data flow, wherein said plurality of data flows point to said join symbol and the joined data flow outgoes from said join symbol;

representing the interaction logic with a split symbol when one data flow splits into a plurality of data flows, wherein said one data flow points to said split symbol and the plurality of split data flows outgoes from said split symbol.

10. The method of claim 9, wherein said join symbol comprises: an AND join symbol and an OR join symbol that represent AND join and OR join respectively.

11. The method of claim 9, wherein said split symbol comprises: an AND split symbol and an OR split symbol that represent AND split and OR split respectively.

12. A computer apparatus for visualizing on a display an interaction relationship among entities, comprising:
   a visualization tool, executing on a processor of the apparatus, for:
   defining each of the entities related to the interaction relationship as an empty entity in an entity container with no detailed internal logic defined for said entity, until said detailed internal logic is provided by a user;
   defining an interface of each of the entities in an interaction space container used to contain and display a data flow-based interaction relationship among entity interfaces, wherein said interface comprises a set of interaction points comprising attributes that represent an interaction data definition;
   defining interaction logic among the interfaces in the interaction space container using data flows to connect interaction points; wherein said each interaction point comprises:
      attributes that represent interaction data definition and/or interaction behavior definition; and
      each said data flow comprises: attributes that represent data mapping rules and/or transformation rules between the two ends of said data flow;
   modeling the entities and their interaction logic as a model in multiple abstraction levels selected by the user for showing/hiding details of an entity among the multiple abstraction levels for enabling a user to understand how an internal logic for each entity affects or is affected by other entities, wherein the model comprises the entity container and the interaction space container; and
   using a graphical user interface with the display for:
   presenting the model in the abstraction level selected by the user in a single view on the display device wherein the two containers can be modeled individually by the user.

13. The computer apparatus of claim 12 further comprising using the visualization tool for defining the internal logic of at least one empty entity in the entity container with the detailed internal logic as provided by the user.

14. The computer apparatus of claim 13 wherein the detailed internal logic is provided by the user via the graphical user interface.

15. The computer apparatus of claim 14 wherein the visualization tool further:
   receives a definition of at least one additional empty entity from the user;
   receives the definition of the internal logic for the at least one additional empty entity; and
   connects related interaction points related to the at least one additional empty entity.

16. The computer apparatus of claim 12 wherein presenting the model in the abstraction level selected by the user comprises displaying the entities in detail mode, comprising:
   displaying the internal logic in the entity container; and
   displaying the entity interface in the interaction space container.

17. The computer apparatus of claim 16 wherein displaying the internal logic comprises displaying at least one of: a flowchart, a state chart, and a UML class diagram.

18. The computer apparatus of claim 12, wherein presenting the model in the abstraction level selected by the user comprises displaying the entities in empty mode, comprising:
   displaying the entity as an interface with a set of interaction points; and not displaying the internal logic.

19. The computer apparatus of claim 12, wherein presenting the model in the abstraction level selected by the user comprises displaying the entities in icon mode, comprising:
   displaying the entity as a symbol in the entity container;
   collapsing secondary entities within the entity container; and
   displaying the interaction space between two interactive entities as a directed solid line in the interaction space container.

20. The computer apparatus of claim 12, further comprising:
   representing the interaction logic with a join symbol when a plurality of data flows join into one data flow, wherein said plurality of data flows point to said join symbol and the joined data flow outgoes from said join symbol;
   representing the interaction logic with a split symbol when one data flow splits into a plurality of data flows, wherein said one data flow points to said split symbol and the plurality of split data flows outgoes from said split symbol.

21. A computer program product comprising program storage device having computer readable program code instructions embodied therein for visualizing on a display an interaction relationship among entities by causing a computer to:
   define each of the entities related to the interaction relationship as an empty entity in an entity container with no detailed internal logic defined for said entity, until said detailed internal logic is provided by a user;
   define an interface of each of the entities in an interaction space container used to contain and display a data flow-based interaction relationship among entity interfaces, wherein said interface comprises a set of interaction points comprising attributes that represent an interaction data definition;
   define interaction logic among the interfaces in the interaction space container using data flows to connect interaction points; wherein said each interaction point comprises:
      attributes that represent interaction data definition and/or interaction behavior definition; and
      each said data flow comprises: attributes that represent data mapping rules and/or transformation rules between the two ends of said data flow;
   model the entities and their interaction logic as a model in multiple abstraction levels selected by the user for showing/hiding details of an entity among the multiple abstraction levels for enabling a user to understand how an internal logic for each entity affects or is affected by other entities, wherein the model comprises the entity container and the interaction space container; and
   use a graphical user interface with the display for: presenting the model in the abstraction level selected by the user in a single view on the display device wherein the two containers can be modeled individually by the user

22. The computer program product of claim 21 further causing the computer to define the internal logic of at least one empty entity in the entity container with the detailed internal logic provided by the user.

23. The computer program product of claim 21 further causing the computer to display the entities in detail mode, comprising:

displaying the internal logic in the entity container; and displaying the entity interface in the interaction space container.

24. The computer program product of claim 21 further causing the computer to display the entities in empty mode, comprising:

displaying the entity as an interface with a set of interaction points; and not displaying the internal logic.

25. The computer program product of claim 21 further causing the computer to display the entities in icon mode, comprising:

displaying the entity as a symbol in the entity container;

collapsing secondary entities within the entity container; and displaying the interaction space between two interactive entities as a directed solid line in the interaction space container.

* * * * *